United States Patent
Barbehoen et al.

(12)

(10) Patent No.: US 6,637,534 B2
(45) Date of Patent: Oct. 28, 2003

(54) SELECTION DEVICE FOR ADJUSTING VEHICLE SPEED

(75) Inventors: Kai Barbehoen, Munich (DE); Joachim Girke, Straubing (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 92 days.

(21) Appl. No.: 09/938,834

(22) Filed: Aug. 27, 2001

(65) Prior Publication Data

US 2002/0036109 A1 Mar. 28, 2002

(51) Int. Cl.[7] .............................................. B60K 31/18
(52) U.S. Cl. ........................ 180/171; 180/170; 180/179
(58) Field of Search ................................ 180/170, 171, 180/176, 178, 179, 168, 169; 701/93, 94, 96; 123/342, 352, 396; 340/441; 73/488, 490, 495, 491

(56) References Cited

U.S. PATENT DOCUMENTS

| 4,374,422 A | * | 2/1983 | O'Keefe et al. | 180/176 |
| 4,380,799 A | * | 4/1983 | Allard et al. | 180/178 |
| 4,537,272 A | * | 8/1985 | Tanigawa et al. | 180/176 |
| 4,540,060 A | * | 9/1985 | Kawata et al. | 180/179 |
| 4,858,135 A | * | 8/1989 | Clish et al. | 180/170 |
| 6,125,320 A | * | 9/2000 | Hellmann et al. | 701/93 |

FOREIGN PATENT DOCUMENTS

| DE | 29703902 | 7/1997 | |
| DE | 19646104 | 4/1998 | |
| DE | 19755470 | 9/1998 | |
| DE | 19850686 | 5/2000 | |
| DE | 10000094 | 7/2001 | |
| GB | 2183837 A | * 6/1987 | .............. G01P/1/10 |
| WO | WO 86/00049 | 1/1986 | |

OTHER PUBLICATIONS

European Search Report and translation thereof.

* cited by examiner

Primary Examiner—Brian L. Johnson
Assistant Examiner—Hau Phan
(74) Attorney, Agent, or Firm—Crowell & Moring LLP

(57) ABSTRACT

A selection device for setting the driving speed of a vehicle is provided having an operating element, a control device, which is connected with the operating element and coupled with an engine control and which is designed so that, upon activation of the control, the vehicle speed will be regulated automatically, whereby at least two vehicle speed values can be marked on a display. These values can be initiated by using the operating element. In addition to the vehicle speed values, a pointer is indicated on the display. The pointer can be moved by using the operating element. In a programming operating mode of the control unit, the set vehicle speeds or the vehicle speeds to be set can be set and erased by use of the pointer. In a driving speed control operating mode of the control unit, the set vehicle speeds can be activated by the use of the pointer.

10 Claims, 1 Drawing Sheet

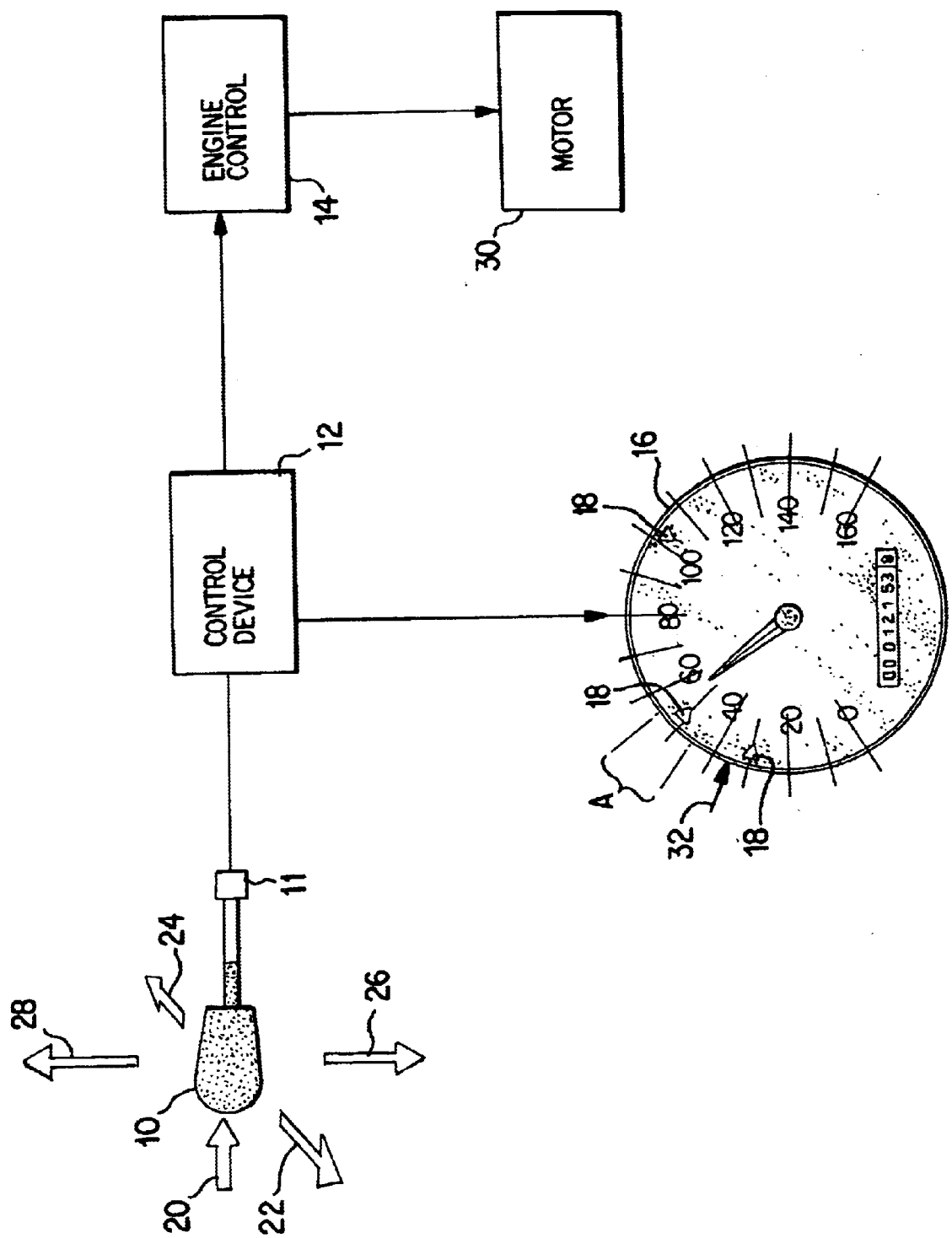

SELECTION DEVICE FOR ADJUSTING VEHICLE SPEED

BACKGROUND AND SUMMARY OF THE INVENTION

This application claims the priority of German Patent Document 100 41 745.0, filed Aug. 25, 2000, the disclosure of which is expressly incorporated by reference herein.

This invention relates to a selection device for setting the driving speed of a vehicle and, in particular, to a selection device having an operating element and a control device that is connected with the operating element and that is coupled with an engine control. The control device is designed so that upon the activation of the engine control, the vehicle speed will be automatically regulated. At least two vehicle speed values can be marked and these values can be started up by working the operating element. A display allows one to indicate the marked speed values.

Such selection devices are known, for example, by the tradename "Tempomat". To increase comfort, especially during long drives at constant speed, it is possible via an operating element to select a vehicle speed that is then regulated automatically and without any action by the driver (FGR mode).

It is furthermore known that the operating element (for example, an operating lever) and an associated control can be designed so that the vehicle speed can be increased or reduced by using the operating element. If the operating element is used over a correspondingly long period of time, one can thus also work toward speeds other than the adjusted vehicle speeds. Reference is made in this connection to German patent documents DE 196 46 104 C1, DE 35 43 163 A1, as well as European patent document EP 0 188 455 B1).

German patent document DE 198 50 686 A1 discloses a typical selection device for the purpose of setting the driving speed of a vehicle. Due to the corresponding design of the operating element and the control device, one can mark at least two vehicle speeds here, and they can be initiated by using the operating element.

But there is one problem connected with the practical design of such a selection device: the operating element should have as many as possible, self-explanatory, functions combined with the smallest possible number of contacts that can be activated. Furthermore, the operator, for instance, must get a signal when the maximum number of programmable vehicle speed values has been attained. Besides, simple programming and activation of the selection device should be possible.

The object of the present invention is to solve these problems.

These problems are solved according to the present invention by a selection device for setting the driving speed of a vehicle having a pointer marking that can be moved by using the operating element. The pointer marking is provided on the display in addition to the marked vehicle speed values. In an operating mode of the control unit (programming mode), the marked speed values for the speed values to be marked can be set and erased by working with the pointer marking. In a second operating mode of the control unit, the set speed values can be activated by working with the pointer.

Accordingly, on a display on which the set speed values can be displayed, there is additionally displayed a pointer marking that can be moved by working the operating element, hereafter referred to as a cursor. In an operating mode of the control unit, which hereafter will be referred to as a programming mode, the set vehicle speeds (or the vehicle speeds that are to be set) can be posted and erased by the use of the cursor. In a second operating mode of the control unit, which hereafter will be referred to as FGR mode (driving speed regulation mode), the set vehicle speed values can be activated by using the cursor.

Supplementing the display of the programmed vehicle speed values, one uses a pointer that in a practical manner, differs in terms of its shape and/or color and/or arrangement from the normal markings for the set vehicle speeds. By means of this pointer, one can support the programming, and the current status of the dialing device can be displayed. Preferably, the cursor can also be operated with the vehicle standing still.

Furthermore, information as to the selection of a certain operating mode can be supplied by means of the cursor. For example, the "programming mode," "FGR mode," or "deactivated ACC mode" states can be displayed by means of a differing color, a differing flashing frequency or a cursor that is turned off.

A particularly preferred embodiment is characterized by the following: the cursor, at least in the programming mode when passing through a specific speed range around a set speed marker, is set precisely on that vehicle speed (i.e., the set speed marker within the range). In that way, one can ensure a minimum interval between two adjustable vehicle speeds. If during its movement the cursor reaches the corresponding vehicle speed range, then it jumps directly to the set vehicle speed. A corresponding example will be explained in the following exemplary embodiment. This embodiment proves to be particularly advantageous for the functional design of the operating element. The cursor can be set only at the corresponding marker in the range around the existing speed markers. Therefore, a separate erase order can definitely be matched up with this speed marker. In that way, one can rule out any ambiguity due to inaccurate positioning. By means of this measure, one can implement the operating functions "erase" and "set" by means of the equal activation of the selection lever in each case.

If the selection device is in the FGR mode, then the cursor can only start at specifically set vehicle speeds according to a specific embodiment.

Preferably, it is only possible to set a certain number of vehicle speeds. On reaching this maximum number of vehicle speed markers, the cursor—also in the programming mode—can only be set for the already-set vehicle speed values. In this way, it can be indicated to the operator in a self-explanatory manner that any further storage of a vehicle speed is not possible and that an already-set vehicle speed marker must be erased before an additional vehicle speed marker is set. In that way, the operator can be informed as to the system state without any additional display.

Other objects, advantages and novel features of the present invention will become apparent from the following detailed description of the invention when considered in conjunction with the accompanying drawings.

BRIEF DESCRIPTION OF THE DRAWING

The FIGURE is a block diagram of the setting device according to the present invention.

DETAILED DESCRIPTION OF THE DRAWING

The FIGURE shows a steering column lever 10 upon which is placed a transmitter 11. Transmitter 11 is connected with a control device 12 that analyzes the signals coming from steering column lever 10 or its transmitter 11 and then relays corresponding orders to an engine control 14. Engine control 14 drives an engine 30 of a vehicle in the automatically regulated vehicle speed mode (FGR mode) as shown in such a manner that the selected speed is retained. Corresponding processes and devices for this purpose are known from the state of the art so that the actual implementation of the FGR mode will not be covered in any greater detail here.

Steering column lever 10, first of all, can be moved up and down (arrows 26, 28). Also, steering column lever 10 can be moved backward and forward (arrows 22, 24). Finally, it is possible to operate the steering column lever 10 in the axial direction like a touch control switch (arrow 20).

Control device 12 is additionally connected with a speedometer 16 by which one can display additional data along with a driving speed that is indicated by means of a needle. This will be explained below.

Various speed markers 18 can be set in the speedometer; one of these can be activated in each case for the FGR mode. When a corresponding speed marker is activated, control device 12 operates the engine control 14 in such a way that the selected speed is retained.

In the example at hand, the speed markers are set for the speed values of 30 km/hr, 50 km/hr and about 103 km/hr. But none of the speed markers has been activated.

In addition, a pointer 32 is illustrated, which, by operating the steering column lever 10, can be moved along the outer edge of the speedometer scale 16. In the exemplary embodiment at hand, pointer 32 is set at a speed value of about 35 km/hr.

Control device 12 is designed now so that the following operating procedure can be implemented:

Basically, three operating modes of the selection device are possible. In a first operating mode, the selection device is switched inactive and the function for maintaining a constant driving speed is deactivated. In this case, no pointers 32 appear on the scale edge of speedometer 16 and no set speed markers 18 appear.

If the steering column lever 10 is moved in arrow direction 24, then in this case, the function for maintaining a constant speed is activated (FGR mode). In this case, the already-set speed markers 18 appear. By operating the steering column lever in arrow direction 20, one can activate an FGR mode for the speed actually being used.

If operating lever 10 is moved in the direction of arrow 22, then a programming mode is selected. In this case, the set speed markers 18 as well as pointer 32 appear.

The way in which the dialing device works in the individual modes will now be explained.

If the programming mode is called up, then operating the steering column lever 10 upward or downward (arrow 26, 28) will move pointer 32 in the corresponding direction along the outer circumference of the scale.

If pointer 32 is set at a certain speed value which is not marked and if, then, steering column lever 10 is moved in axial direction 20, then this speed value is thus programmed in and a corresponding speed marker 18 appears on the speedometer 16.

Each speed marker 18, however, includes a speed range over which cursor 32 cannot be moved continually; instead it is merely set at the precise position of the particular speed marker. Such a speed range is illustrated in the FIGURE with the second speed marker and is labeled with the letter A. In that way, one can define a minimum interval between the adjustable vehicle speeds. By the way, one can rule out any ambiguities. If pointer 32 agrees with a programmed speed marker, then the latter can again be erased by operating steering column lever 10 in the axial direction (arrow 20).

On the whole, only a certain number of speed markers 18 can be set with the selection device at hand. Once this maximum number has been reached, then pointer 32 can be moved only precisely to the individual speed markers even in the programming mode. This tells the operator that the maximum number of storable speed markers has been set. An already-set speed marker must be erased before another speed marker can be set.

If the FGR mode has been activated, then pointer 32 is first of all keyed in, and, depending on the direction of activation, it is shifted via the two arrow directions 26 and 28 in each case toward the speed markers that adjoin on top or below. Once a speed marker has been started, it can be activated again by pressing the steering control lever 10 so that the vehicle will then, as much as possible, maintain the speed selected then as the regulated speed. An activated speed marker is indicated by a different kind of optical display.

The mode that has just been chosen can be indicated by differing pointers 32 (color, flashing, etc.).

Naturally, the above embodiment merely represents one specific variant of the invention at hand. For example, the speed markers, pointer, selection device modes, etc., can be designed in different ways. What is essential to the invention is that the pointer can be illustrated in addition to the speed markers and can be moved with the operating element.

A selection device for setting a driving speed of a vehicle was presented above; here, the operating procedures are clearly simplified. Additionally, it is possible to achieve a cost savings. The described designs are practical, particularly when graphical interfaces can be fashioned in a variable manner by a user.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A selection device for setting a driving speed of a vehicle, comprising:

an operating element;

a control device operatively coupled with the operating element;

an engine control coupled with the control device so that, upon activation of the engine control by the control device, the driving speed of the vehicle will be automatically regulated;

a display operatively coupled with the control device, wherein at least two vehicle speed values are markable on the display using the operating element;

wherein the display further comprises a pointer mark movable through use of the operating element; and wherein in a first operating mode of the control device, the markable vehicle speed values are settable and erasable through the use of the pointer mark, and in a second operating mode of the control unit, any set marked speed values are activated to control the driving speed of the vehicle accordingly through the use of the pointer mark.

2. The selection device according to claim 1, wherein the pointer mark on the display differs from the markable set vehicle speed values in terms of at least one of a shape, color and arrangement.

3. The selection device according to claim 2, wherein information on activation of a particular operating mode is suppliable by differing illustrations of the pointer mark.

4. The selection device according to claim 2, wherein the first operating mode is a programming mode, in which the pointer mark passing through a specific speed range around a set marked vehicle speed is set precisely on the set marked vehicle speed value.

5. The selection device according to claim 1, wherein information on activation of a particular operating mode is suppliable by differing illustrations of the pointer mark.

6. The selection device according to claim 5, wherein the first operating mode is a programming mode, in which the pointer mark passing through a specific speed range around a set marked vehicle speed is set precisely on the set marked vehicle speed value.

7. The selection device according to claim 1, wherein the first operating mode is a programming mode, in which the pointer marking passing through a specific speed range around a set marked set vehicle speed is set precisely on the set marked vehicle speed value.

8. The selection device according to claim 1, wherein only a predetermined number of vehicle speeds are markable on the display such that, upon reaching the predetermined number of markable vehicle speeds, the pointer mark is settable only on already-set marked vehicle speeds in the first operating mode.

9. The selection device according to claim 1, wherein in an automatic regulation mode, only the set marked vehicle speed are activatable through the use of the operating element.

10. The selection device according to claim 1, wherein predetermined operations of the operating element in the first operating mode allows a set marked vehicle speed to be erased using the pointer mark and allows a previously non-programmed vehicle speed to be marked at a position of the pointer mark.

* * * * *

UNITED STATES PATENT AND TRADEMARK OFFICE
CERTIFICATE OF CORRECTION

PATENT NO. : 6,637,534 B2
DATED : October 28, 2003
INVENTOR(S) : Kai Barbehoen et al.

It is certified that error appears in the above-identified patent and that said Letters Patent is hereby corrected as shown below:

<u>Title page,</u>
Please add the Foreign Application Priority Data as follows:

-- [30]  Foreign Application Priority Data

August 25, 2000  (DE)  100 41 745.0 --

Signed and Sealed this

Sixteenth Day of March, 2004

JON W. DUDAS
*Acting Director of the United States Patent and Trademark Office*